(12) United States Patent
Incorvia et al.

(10) Patent No.: US 6,205,809 B1
(45) Date of Patent: Mar. 27, 2001

(54) SELF-RETAINING ADSORBENT UNIT

(75) Inventors: Samuel A. Incorvia, North Tonawanda; John R. Semler, Williamsville, both of NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

(21) Appl. No.: 09/487,500

(22) Filed: Jan. 19, 2000

(51) Int. Cl.[7] .................................................. F25B 43/00
(52) U.S. Cl. .................................. 62/474; 62/503; 96/147
(58) Field of Search .......................... 62/474–475, 503, 62/509; 55/503, 507, 515; 96/147, 153; 210/282

(56) References Cited

U.S. PATENT DOCUMENTS

| 4,116,649 | * | 9/1978 | Cullen et al. ............... | 62/474 X |
| 4,405,347 | | 9/1983 | Cullen et al. ............... | 55/387 |
| 4,464,261 | | 8/1984 | Cullen et al. ............... | 210/282 |
| 4,619,673 | | 10/1986 | Cullen et al. ............... | 55/387 |
| 5,636,525 | | 6/1997 | Riemenschneider ......... | 62/474 |
| 5,802,868 | * | 9/1998 | Riemenschneider ......... | 62/474 |
| 5,987,915 | | 11/1999 | Incorvia et al. ............. | 62/474 |
| 5,996,371 | * | 12/1999 | Riemenschneider ......... | 62/474 |

* cited by examiner

*Primary Examiner*—Corrine McDermott
*Assistant Examiner*—Chen-Wen Jiang
(74) *Attorney, Agent, or Firm*—Joseph P. Gastel

(57) ABSTRACT

An adsorbent unit including a porous container, adsorbent in the container, at least one tab extending outwardly from the container, side edges on the tab, and concave indentations in the side edges. The tab can have an aperture therein for mounting the tab on the filter body of a return bend of an accumulator. Another embodiment of the adsorbent unit can include two tabs extending outwardly from the opposite ends of the container, rigid outer ends on the tabs, and concave indentations in the sides of the tabs between the outer ends of the tabs and the adsorbent container. In use, the concave indentations of the various tabs receive the spaced pipes of a return bend pipe utilized in a refrigerant accumulator.

20 Claims, 4 Drawing Sheets

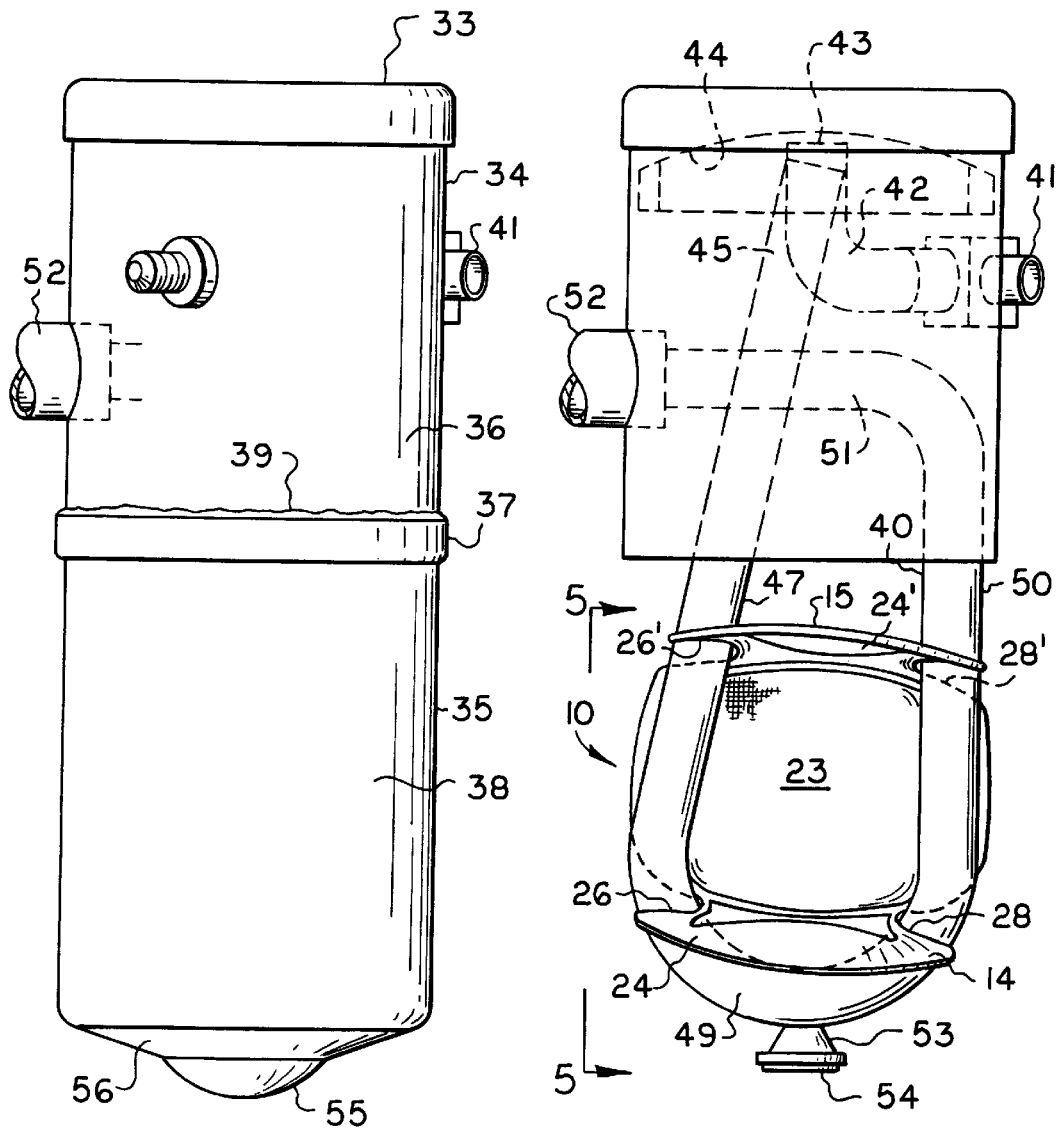

SELF-RETAINING ADSORBENT UNIT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an adsorbent unit for use in a refrigerant accumulator of an air conditioning system which contains a U-shaped return bend pipe.

By way of background, an adsorbent unit is utilized in a refrigerant accumulator for the purpose of adsorbing moisture in the refrigerant. Insofar as known, in the past, when a single adsorbent unit was utilized in a refrigerant accumulator having a U-shaped return bend pipe, the bag itself was usually not partially secured relative to the spaced pipes by means of concave indentations in the fabric portion thereof.

BRIEF SUMMARY OF THE INVENTION

It is one object of the present invention to provide an improved single container adsorbent unit for a U-bend pipe of a refrigerant accumulator in which the mounting structure includes a fabric portion having concave indentations which secure the adsorbent unit relative to the U-bend pipe. Other objects and attendant advantages of the present invention will readily be perceived hereafter.

The present invention relates to an adsorbent unit comprising a single porous adsorbent container, adsorbent in said container, at least one tab extending outwardly from said container, side edges on said tab, and concave indentations in said side edges.

The present invention also relates to a refrigerant accumulator having a housing with a bottom wall and a side wall and a U-shaped pipe with a return bend adjacent said bottom wall and with first and second pipe portions extending from said return bend within said housing, the improvement comprising a single porous adsorbent container, a tab on said container, an outer end on said tab remote from said container, side edges on said tab, and concave indentations in said side edges between said container and said outer end of said tab receiving said first and second pipe portions adjacent said return bend.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 3 is a side elevational view of an accumulator type of receiver in which the adsorbent unit is mounted;

FIG. 4 is a side elevational view of the accumulator of FIG. 3 with the bottom portion removed and the adsorbent unit of the present invention mounted relative to the U-bend pipe therein;

DETAILED DESCRIPTION OF THE INVENTION

Figure 1:
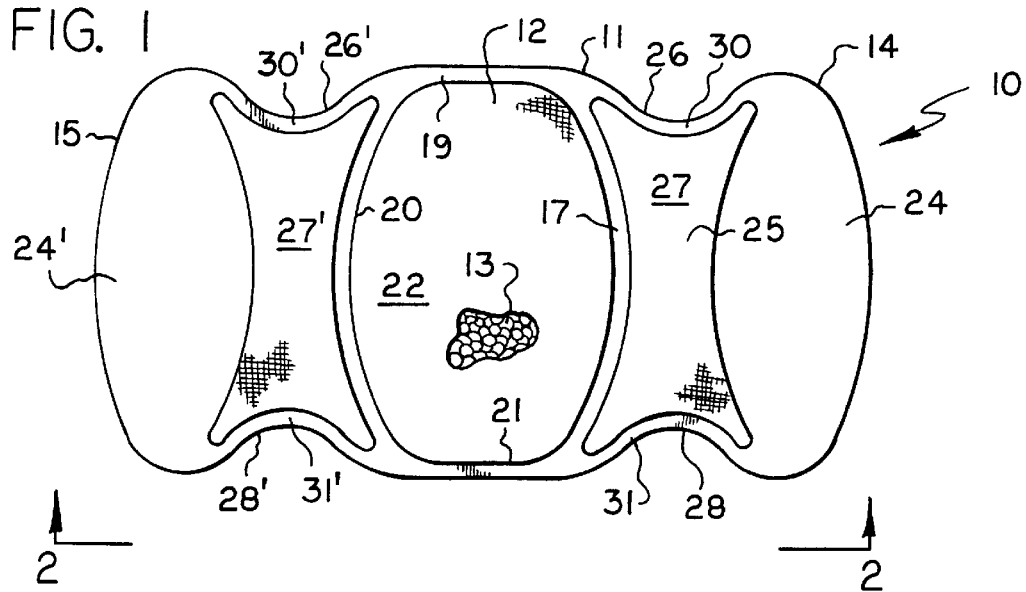
FIG. 1 is a partially broken away plan view of one embodiment of the adsorbent unit of the present invention.
Figure 2:
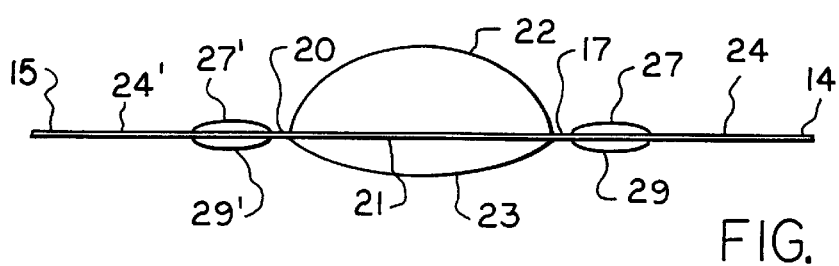
FIG. 2 is a side elevational view taken substantially in the direction of arrows 2—2 of FIG. 1.

The adsorbent unit 10 of the present invention includes a casing 11 formed of porous material, in this instance, heat-fusible felted polyester, but it may be fabricated of any other suitable fusible material. Casing 11 is formed from two sides of felted polyester which are bonded together by fused seams, and it comprises a container 12 containing adsorbent 13 with the container having tabs 14 and 15 extending outwardly from the opposite end portions thereof, as described in detail hereafter. The preferred adsorbent is molecular sieve but any other suitable adsorbent may be used.

Container 12 is defined by fused seams 17, 19, 20 and 21. Container 12 has a pronounced convex surface 22 and a less convex surface 23. However, surface 23 may be substantially planar. Tab 14 includes an outer portion 24 which is fabricated by fusing the two sides of felted polyester under suitable heat and pressure into a substantially rigid member of substantially oval shape. Tab 14 also includes a portion 25 which consists of two layers 27 and 29 of felted polyester and the outer edges of portion 25 consists of fused seams 30 and 31. Fused seam 30 extends between fused tab portion 24 and fused seam 19, and fused seam 31 extends between outer tab end 24 and fused seam 21. Tab 15 is a mirror image of tab 14 and the portions thereof are designated by primed numerals which correspond to the structure of the unprimed numerals of tab 14, and therefore a further description of tab 15 is deemed unnecessary.

The adsorbent unit 10 is intended to be mounted in a prior art accumulator type of receiver 33 (FIGS. 3 and 4) which includes an upper cylindrical housing portion 34 having a side wall 36 and a lower cylindrical housing portion 35 having a side wall 38 and having a flange 37 which receives the lower edge portion of upper portion 48 with an interference fit, and a joint is thereafter hermetically welded at 39. Insofar as pertinent here, the accumulator 33 includes a U-bend pipe 40 and a refrigerant inlet 41 which receives a mix of gaseous and liquid refrigerant and conducts it through pipe 42 having an open end 43 proximate concave surface 44 such that the refrigerant impinges thereon after it leaves pipe 42. The upper end 45 of U-shaped pipe 40 is open and it receives gaseous refrigerant which passes through pipe 47, return bend 49, pipe 50 and pipe 51 to outlet 52 which leads to the compressor, as is well known in the art. As noted above, the gaseous refrigerant passes through U-shaped pipe 40 because it rises to the top while the liquid refrigerant from the evaporator drops to the bottom of the accumulator. A lubricant inlet (not shown) is located at the underside of the return bend 49 such that the lubricant which accumulates in the depression 55 of bottom wall 56 is induced into the return bend and conveyed with the gaseous refrigerant to the compressor, as is well known in the art. As can be seen from FIG. 4, the U-bend 40 includes two spaced pipes 47 and 50 which are connected by U-bend 49. In the present instance, pipe 50 is substantially vertical and pipe 47 is inclined. The U-bend 40 is sometimes referred to as a J-bend.

Figure 5:
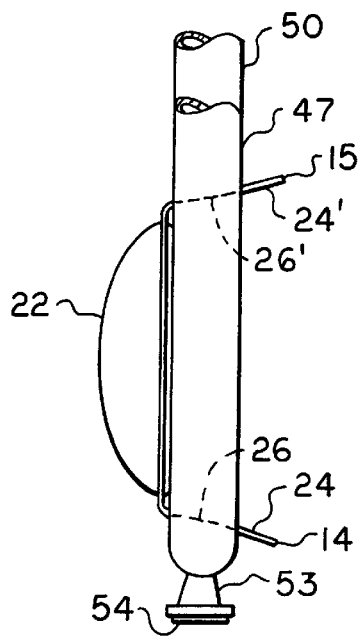
FIG. 5 is a fragmentary side elevational view taken substantially in the direction of arrows 5—5 of FIG. 4.
Figure 6:
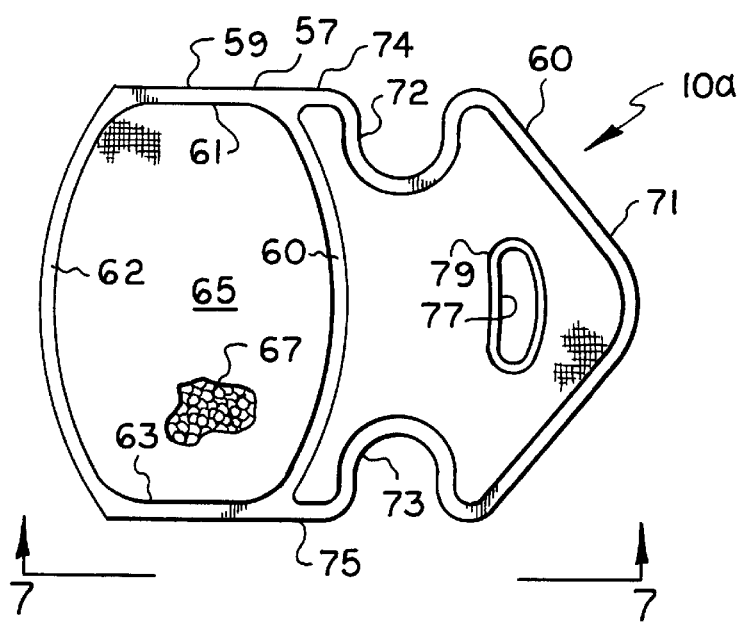
FIG. 6 is a partially broken away plan view of another embodiment of the adsorbent unit of the present invention.
Figure 7:
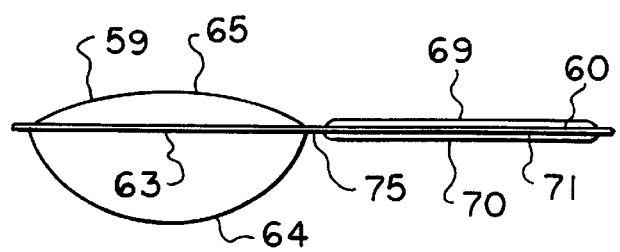
FIG. 7 is a side elevational view taken substantially in the direction of arrows 7—7 of FIG. 6.
Figure 9:
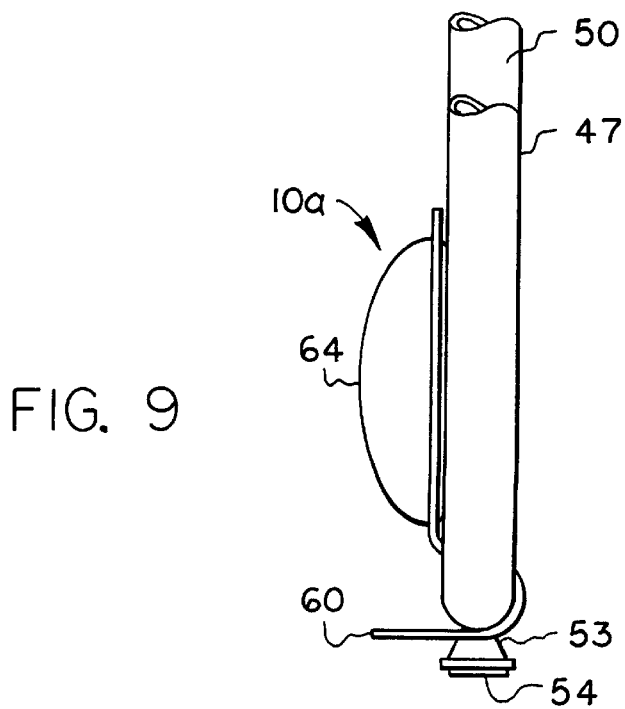
FIG. 9 is a fragmentary side elevational view taken substantially in the direction of arrows 9—9 of FIG. 8.

In FIGS. 4 and 5 the adsorbent unit 10 is shown in its installed position. In this respect, concave indentations 26 and 28 of tab 14 receive pipe portions 47 and 50, respectively, which are adjacent return bend 49. Additionally, concave indentations 26' and 28' of tab 15 receive pipes 47 and 50, respectively, which are remote from U-bend 49. The stiffness of the outer ends 24 and 24' of tabs 14 and 15, respectively, maintains the adsorbent unit 10 in position and the retention in position is aided by fused seams 30, 31, 30' and 31'.

In FIGS. 6–9 another embodiment of the present invention is disclosed. An adsorbent unit 10a includes a casing 57 having an adsorbent container 59 and a tab 60 extending outwardly from the end thereof. Casing 57 is formed of two sides of felted polyester which are bonded to each other by fused seams. Container 59 is defined by fused seams 60, 61, 62 and 63, and it includes a pronounced convex side 64 and a less pronounced convex side 65. A suitable adsorbent 67, such as molecular sieve, is contained within container 59.

The two sides 69 and 70 of tab 60 are defined by a fused seam 71 and fused seam 60 of container 59. Fused seam 71 includes concave indentations 72 and 73 and the ends 74 and 75 of fused seam 71 merge into fused seam 60 where it merges into fused seams 59 and 63, respectively. A slot-like aperture 77 is formed in tab 60 and it is outlined by fused seam 79.

Figure 8:
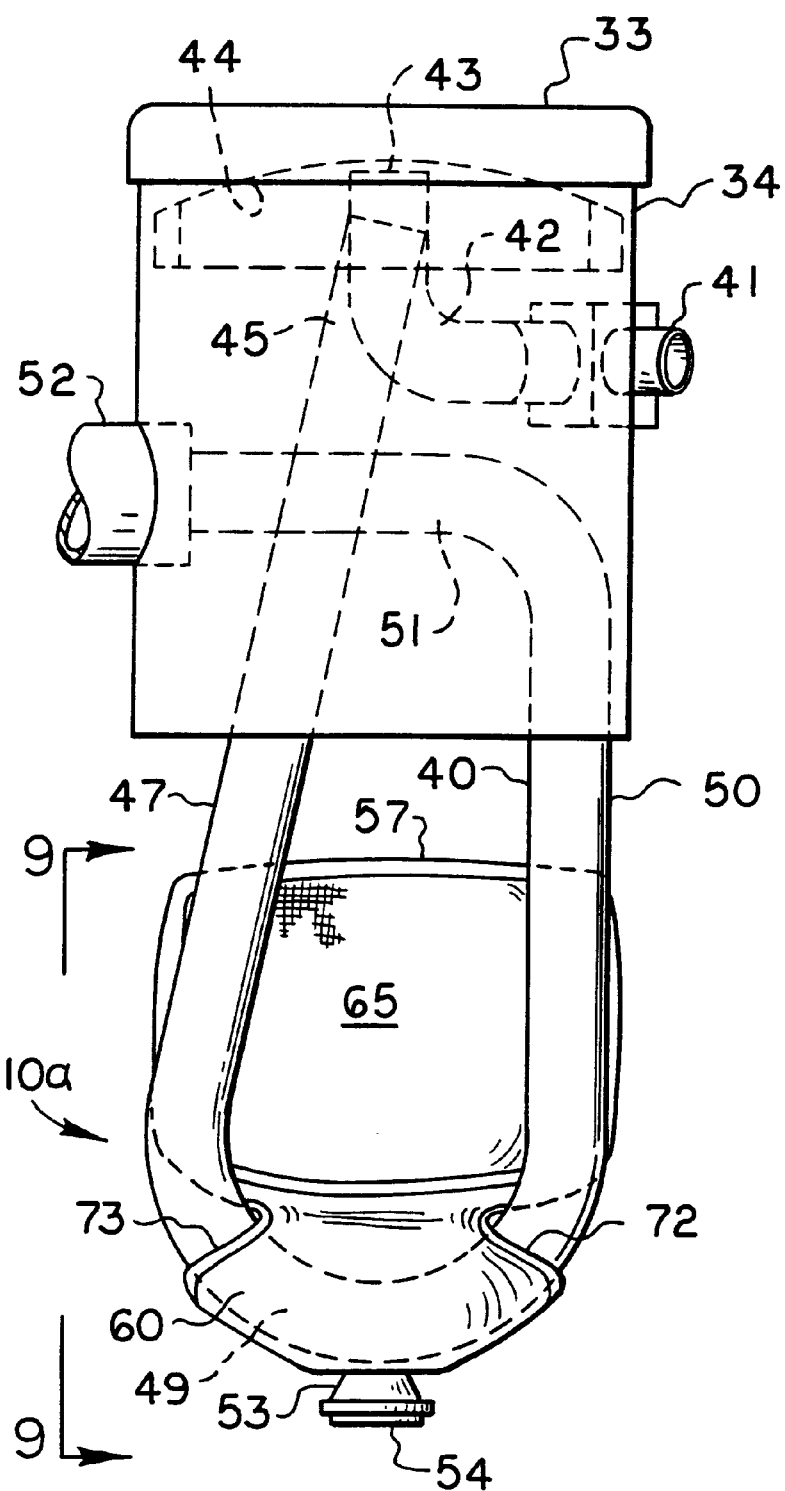
FIG. 8 is a view similar to FIG. 4 but showing the adsorbent unit of FIGS. 6 and 7 mounted on the U-bend pipe.

Adsorbent unit 10a is mounted on the U-bend 40 of an accumulator-type of receiver 33 shown in FIG. 8. Accumulator 33 is identical to that described above in FIG. 4 and like numerals represent like elements of structure. Therefore, the total description of accumulator 33 will not be repeated.

Adsorbent unit 10a is mounted by inserting the filter housing 53 through aperture 77 and thereafter threading the container 59 between legs 47 and 50 so that concave indentations 73 and 72 receive the lower portions of pipes 47 and 50, respectively, proximate return bend 49. Thus, the less pronounced side 65 of container 57 will be adjacent legs 47 and 50.

While preferred embodiments of the present invention have been disclosed, it will be appreciated that it is not limited thereto but may be otherwise embodied within the scope of the following claims.

What is claimed is:

1. An adsorbent unit comprising a porous adsorbent container, adsorbent in said container, first and second end portions on said container, first and second tabs extending outwardly from said first and second end portions, respectively, said porous adsorbent container and said first and second tabs including at least portions fabricated of fusible plastic fabric, said first and second tabs including outer portions which are more rigid than said fusible plastic fabric of said container, and said first and second tabs including first and second concave side edges, respectively, between said outer portions of said tabs and said porous adsorbent container.

2. An adsorbent unit as set forth in claim 1 wherein said porous adsorbent unit and said first and second tabs comprise opposite sides of said fusible plastic fabric.

3. An adsorbent unit as set forth in claim 1 wherein said porous adsorbent container includes first and second convex sides with said first convex side being more convex than said second convex side.

4. An adsorbent unit as set forth in claim 1 wherein said porous adsorbent container includes at least one convex side.

5. An adsorbent unit as set forth in claim 1 wherein said porous adsorbent unit and said first and second tabs comprise opposite sides of said fusible plastic fabric.

6. An adsorbent unit comprising a porous adsorbent container, a tab on said container, an aperture in said tab, and concave indentations in the side edges of said tab between said aperture and said container.

7. An adsorbent unit as set forth in claim 6 wherein said porous adsorbent container comprises fusible plastic fabric, and wherein said side edges comprise fused plastic at said concave indentations.

8. An adsorbent unit as set forth in claim 7 wherein said porous adsorbent container includes at least one concave side.

9. An adsorbent unit as set forth in claim 7 wherein said porous adsorbent container includes first and second convex sides with said first convex side being more convex than said second convex side.

10. In a refrigerant accumulator having a housing with a bottom wall and a side wall and a U-shaped pipe with a return bend adjacent said bottom wall and with first and second pipe portions extending from said return bend within said housing and a filter body extending outwardly from said return bend, the improvement comprising a porous adsorbent container, a tab on said container, an aperture in said tab mounting said tab on said filter body, side edges on said tab, and concave indentations in said side edges located between said container and said aperture receiving said first and second pipe portions.

11. In a refrigerant accumulator as set forth in claim 10 wherein said porous adsorbent container comprises fusible plastic fabric, and wherein said side edges comprise fused plastic at said concave indentations.

12. In a refrigerant accumulator as set forth in claim 11 wherein said porous adsorbent container includes at least one concave side.

13. In a refrigerant accumulator as set forth in claim 11 wherein said porous adsorbent container includes first and second convex sides with said first convex side being more convex than said second convex side.

14. In a refrigerant accumulator as set forth in claim 13 wherein said second convex side is positioned adjacent said first and second pipe portions.

15. In a refrigerant accumulator having a housing with a bottom wall and a side wall and a U-shaped pipe with a return bend adjacent said bottom wall and with first and second pipe portions extending from said return bend within said housing, the improvement comprising a porous adsorbent container, adsorbent in said container, first and second end portions on said container, first and second tabs extending outwardly from said first and second end portions, respectively, said porous adsorbent container and said first and second tabs including at least portions fabricated of fusible plastic fabric, said first and second tabs including outer portions which are more rigid than said fusible plastic fabric of said container, and said first and second tabs including first and second concave side edges, respectively, between said outer portions of said tabs and said porous adsorbent container whhich receive said first and second pipe portions.

16. In a refrigerant accumulator as set forth in claim 15 wherein said first concave side edges are positioned adjacent said return bend, and wherein said second concave side edges are positioned on the opposite side of said first concave side edges from said return bend.

17. In a refrigerant accumulator as set forth in claim 16 wherein said first and second concave side edges include fused seams.

18. In a refrigerant accumulator having a housing with a bottom wall and a side wall and a U-shaped pipe with a return bend adjacent said bottom wall and with first and second pipe portions extending from said return bend within said housing, the improvement comprising a porous adsorbent container, a tab on said container, an outer end on said tab remote from said container, side edges on said tab, and concave indentations in said side edges between said container and said outer end of said tab receiving said first and second pipe portions adjacent said return bend.

19. In a refrigerant accumulator as set forth in claim 18 wherein said first and second concave side edges include fused seams.

20. An adsorbent unit comprising a single porous adsorbent container, adsorbent in said container, at least one tab extending outwardly from said container, side edges on said tab, and concave indentations in said side edges.

* * * * *